US010455229B2

(12) United States Patent
Mao

(10) Patent No.: US 10,455,229 B2
(45) Date of Patent: Oct. 22, 2019

(54) PREDICTION MODE SELECTION METHOD, APPARATUS AND DEVICE

(71) Applicant: TENCENT TECHNOLOGY (SHENZHEN) COMPANY LIMITED, Shenzhen (CN)

(72) Inventor: Xunan Mao, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 156 days.

(21) Appl. No.: 15/684,940

(22) Filed: Aug. 24, 2017

(65) Prior Publication Data

US 2017/0353720 A1   Dec. 7, 2017

Related U.S. Application Data

(63) Continuation of application No. PCT/CN2016/078936, filed on Apr. 11, 2016.

(30) Foreign Application Priority Data

May 8, 2015   (CN) .......................... 2015 1 0232351

(51) Int. Cl.
*H04N 19/11* (2014.01)
*H04N 19/159* (2014.01)
(Continued)

(52) U.S. Cl.
CPC ........... *H04N 19/11* (2014.11); *H04N 19/147* (2014.11); *H04N 19/159* (2014.11);
(Continued)

(58) Field of Classification Search
CPC .... H04N 19/11; H04N 19/194; H04N 19/147; H04N 19/186; H04N 19/159; H04N 19/176
See application file for complete search history.

(56) References Cited

U.S. PATENT DOCUMENTS

2011/0170601 A1   7/2011   Kim
2011/0243225 A1   10/2011   Min
(Continued)

FOREIGN PATENT DOCUMENTS

CN   101222635 A   7/2008
CN   101309408 A   11/2008
(Continued)

OTHER PUBLICATIONS

Changsung Kim et al: "Multistage mode decision for intra prediction in H.264 codec", Jan. 2004, Visual Communications and Image Processing 2004; SPIE vol. 5308, pp. 355-363.*
(Continued)

*Primary Examiner* — James M Pontius
(74) *Attorney, Agent, or Firm* — Syncoda LLC; Feng Ma

(57) ABSTRACT

Provided are a prediction mode selection method, apparatus and system related to the field of video coding. The method includes: selecting, for the current prediction unit, a first group of candidate intra-frame chromaticity prediction modes from N intra-frame prediction modes, performing a prediction residual cost calculation on each candidate intra-frame chromaticity prediction mode in the first group to obtain a difference evaluation value, selecting a second group of candidate intra-frame chromaticity prediction modes from the first group of candidate intra-frame chromaticity prediction modes according to the difference evaluation values, performing a coding cost calculation on each candidate intra-frame chromaticity prediction mode in the second group to obtain a coding cost value; and determining, according to the coding cost values, one of the candidate intra-frame chromaticity prediction modes in the second group that has a lowest coding cost, as an intra-frame chromaticity prediction mode of the current prediction unit.

12 Claims, 7 Drawing Sheets

(51) Int. Cl.
  *H04N 19/186* (2014.01)
  *H04N 19/176* (2014.01)
  *H04N 19/147* (2014.01)
  *H04N 19/194* (2014.01)
(52) U.S. Cl.
  CPC ......... *H04N 19/176* (2014.11); *H04N 19/186* (2014.11); *H04N 19/194* (2014.11)

(56) References Cited

U.S. PATENT DOCUMENTS

| | | |
|---|---|---|
| 2013/0329793 A1 | 12/2013 | Min et al. |
| 2015/0117532 A1 | 4/2015 | Min et al. |
| 2015/0117533 A1 | 4/2015 | Min et al. |
| 2015/0124881 A1 | 5/2015 | Min et al. |
| 2017/0223364 A1 | 8/2017 | Min et al. |
| 2017/0353720 A1 | 12/2017 | Mao |
| 2017/0374370 A1 | 12/2017 | Min et al. |

FOREIGN PATENT DOCUMENTS

| | | |
|---|---|---|
| CN | 101309421 A | 11/2008 |
| CN | 101350927 A | 1/2009 |
| CN | 102547257 A | 7/2012 |
| CN | 104853192 A | 8/2015 |
| WO | 2012119569 A1 | 9/2012 |

OTHER PUBLICATIONS

International Search Report in international application No. PCT/CN2016/078936, dated Jul. 1, 2016.
English Translation of the Written Opinion of the International Search Authority in international application No. PCT/CN2016/078936, dated Jul. 1, 2016.
Notification of the First Office Action of Chinese application No. 201510232351.X, dated Jul. 19, 2017.
English translation of the Notification of the First Office Action of Chinese application No. 201510232351.X, dated Jul. 19, 2017.
Supplementary European Search Report in European application No. 16791979.4, dated Apr. 30, 2018.
Changsung Kim et al : "Multistage mode decision for intra prediction in H.264 codec ",Visual Communications and Image Processing; Jan. 20, 2004-Jan. 20, 2004; SanJose,,Jan. 20, 2004 (Jan. 20, 2004), XP030081300.
Abderrahmane Elyousfi et al: "Fast Mode Decision Algorithm for Intra prediction in H.264/AVC Video Coding", Internet Citation,Jan. 1, 2007 (Jan. 1, 2007),pp. 356-364, XP002597544, Retrieved from the Internet: URL:http://paper.ijcsns.org/07_book/200701/200701B21.pdf[retrieved on Aug. 12, 2010].
Lin (Hisilicon) Y et al:"Modifications to Intra-frame coding", 7. JCT-VC Meeting; 98. MPEG Meeting; Nov. 21, 2011-Nov. 30, 2011; Geneva; (Joint Collaborative Team on Video Coding of ISO/IEC JTC1/SC29/WG11 and ITU-T SG.16 ); URL: http://wftp3.itu.int/av-arch/jctvc-site/, No. JCTVC-G119, Nov. 8, 2011 (Nov. 8, 2011), XP030110103.
English Translation of the Notification of the First Office Action of European application No. 16791979.4, dated Feb. 20, 2019.

\* cited by examiner

PREDICTION MODE SELECTION METHOD, APPARATUS AND DEVICE

The application is a continuation application of International Patent Application No. PCT/CN2016/078936, filed on Apr. 11, 2016, which claims priority to Chinese Patent Application No. 201510232351.X, titled 'prediction mode selection method and apparatus', filed on May 8, 2015. The disclosures of these applications are incorporated herein in their entirety by reference.

BACKGROUND

High Efficient Video Coding (HEVC) is a new generation of video coding standard developed as a successor to H.264. In HEVC, each image frame is applicable to an intra-frame prediction mode, and there are 35 intra-frame prediction modes available.

To select an intra-frame chromaticity prediction mode for a current image frame, firstly, 5 of the 35 intra-frame prediction modes are required to be selected as candidate intra-frame prediction modes, then a coding cost value, which can be represented by a code rate resulting from a coding processing and a distortion rate of reconstructed image frames, is calculated for each candidate intra-frame prediction mode, and last, the optimal one of the five candidate intra-frame prediction modes is selected according to the calculated coding cost values as the intra-frame chromaticity prediction mode of the current image frame.

In the process of implementing the disclosure, the inventor has found that the foregoing technology has the following technical problems: as a large amount of calculation needs to be conducted for calculation of a coding cost value and it is required to calculate the coding cost value for each candidate intra-frame prediction mode during the process of selecting an intra-frame prediction mode for the current image frame, low calculation efficiency is resulted.

SUMMARY

The embodiments of the disclosure relate to the field of video coding, and in particular to a prediction mode selection method, apparatus and device.

To solve the technical problems existing in the conventional art, a prediction mode selection method, apparatus and device are provided in the disclosure. The technical solutions are implemented as follows.

In a first aspect, there is provided a prediction mode selection method, which includes:

a first group of candidate intra-frame chromaticity prediction modes are selected, for a current prediction unit, from N intra-frame prediction modes, where N is a positive integer;

a prediction residual cost calculation is performed on each candidate intra-frame chromaticity prediction mode in the first group to obtain a difference evaluation value;

a second group of candidate intra-frame chromaticity prediction modes are selected from the first group of candidate intra-frame chromaticity prediction modes according to the difference evaluation values, herein the second group of candidate intra-frame chromaticity prediction modes is a proper subset of the first group of candidate intra-frame chromaticity prediction modes;

a coding cost calculation is performed on each candidate intra-frame chromaticity prediction mode in the second group to obtain a coding cost value; and one of the candidate intra-frame chromaticity prediction modes in the second group that has a lowest coding cost, is determined, according to the coding cost values, as an intra-frame chromaticity prediction mode of the current prediction unit.

In a second aspect, there is provided a prediction mode selection apparatus, which includes:

a first selection module configured to select, for a current prediction unit, a first group of candidate intra-frame chromaticity prediction modes from N intra-frame prediction modes, wherein N is a positive integer;

a residual calculation module configured to perform a prediction residual cost calculation on each candidate intra-frame chromaticity prediction mode in the first group to obtain a difference evaluation value;

a second selection module configured to select a second group of candidate intra-frame chromaticity prediction modes from the first group of candidate intra-frame chromaticity prediction modes according to the difference evaluation values, wherein the second group of candidate intra-frame chromaticity prediction modes is a proper subset of the first group of candidate intra-frame chromaticity prediction modes;

a cost calculation module configured to perform a coding cost calculation on each candidate intra-frame chromaticity prediction mode in the second group to obtain a coding cost value; and a mode determination module configured to determine, according to the coding cost values, one of the candidate intra-frame chromaticity prediction modes in the second group that has a lowest coding cost, as an intra-frame chromaticity prediction mode of the current prediction unit.

In a third aspect, there is provided a video coding device, which includes: one or more processors and a memory in which one or more programs are stored, herein the one or more programs are configured to be executed by the one or more processors and include instructions for executing the following operations of:

selecting, for a current prediction unit, a first group of candidate intra-frame chromaticity prediction modes from N intra-frame prediction modes, wherein N is a positive integer;

performing a prediction residual cost calculation on each candidate intra-frame chromaticity prediction mode in the first group to obtain a difference evaluation value;

selecting a second group of candidate intra-frame chromaticity prediction modes from the first group of candidate intra-frame chromaticity prediction modes according to the difference evaluation values, herein the second group of candidate intra-frame chromaticity prediction modes is a proper subset of the first group of candidate intra-frame chromaticity prediction modes;

performing a coding cost calculation on each candidate intra-frame chromaticity prediction mode in the second group to obtain a coding cost value; and determining, according to the coding cost values, one of the candidate intra-frame chromaticity prediction modes in the second group that has a lowest coding cost, as an intra-frame chromaticity prediction mode of the current prediction unit.

In a fourth aspect, there is provided A non-transitory computer-readable storage medium having stored therein instructions that, when executed by a processor of a video coding device, causes the video coding device to perform a prediction mode selection method, the method including:

selecting, for a current prediction unit, a first group of candidate intra-frame chromaticity prediction modes from N intra-frame prediction modes, wherein N is a positive integer;

performing a prediction residual cost calculation on each candidate intra-frame chromaticity prediction mode in the first group to obtain a difference evaluation value;

selecting a second group of candidate intra-frame chromaticity prediction modes from the first group of candidate intra-frame chromaticity prediction modes according to the difference evaluation values, wherein the second group of candidate intra-frame chromaticity prediction modes is a proper subset of the first group of candidate intra-frame chromaticity prediction modes;

performing a coding cost calculation on each candidate intra-frame chromaticity prediction mode in the second group to obtain a coding cost value; and determining, according to the coding cost values, one of the candidate intra-frame chromaticity prediction modes in the second group that has a lowest coding cost, as an intra-frame chromaticity prediction mode of the current prediction unit.

The technical solutions of the disclosure have the beneficial as follows.

By obtaining the optimal intra-frame chromaticity prediction mode through a primary selection implemented by calculating prediction residual costs and a secondary selection implemented by calculating coding cost values, the disclosure solves the low calculation efficiency problem of the conventional art that is caused by the need of performing a coding cost value calculation on each candidate intra-frame chromaticity prediction mode, and consequentially effectively reduces the amount of calculation and improves coding efficiency as the calculation amount of difference evaluation values is ⅙-¼ of that of coding cost values.

BRIEF DESCRIPTION OF THE DRAWINGS

To illustrate the technical solutions of the disclosure more clearly, the accompanying drawings used for the illustration of the disclosure are introduced briefly below, and apparently, the accompanying drawings involved in the description below are merely embodiments of the disclosure, and other accompanying drawings can be devised by those of ordinary skill in the art without making any creative effort.

DETAILED DESCRIPTION

To make the objectives, the technical solutions and the advantages of the disclosure understood better, the disclosure is further elaborated below in detail with reference to accompanying drawings embodiments when read in conjunction with embodiments.

First, the terms involved in the disclosure are introduced briefly as follows.

Image frame: a plurality of image frames constitute a video; video compression coding is generally based on blocks, that is, in video compression coding, an image frame in a video is divided into a plurality of non-overlapped blocks, and then the blocks are coded. Each image frame is subjected to inter-frame coding or intra-frame coding during a video coding process. The disclosure mainly involves intra-frame coding.

Intra-prediction coding: as the sequential images of a video are closely related in space, for example, the background of an image frame is a wall composed of the same patterns and textures, if the image frame is divided into a plurality of blocks, then blocks relating to the wall may display the same or similar information, thus, these blocks that are closely related in space can be coded using an intra-frame prediction technology.

Prediction Unit (PU): it is a basic unit for the prediction coding in an image frame; the PU may be a block in a dimension of 64*64 pixels, 32*32 pixels, 16*16 pixels, 8*8 pixels or the like.

Figure 1:
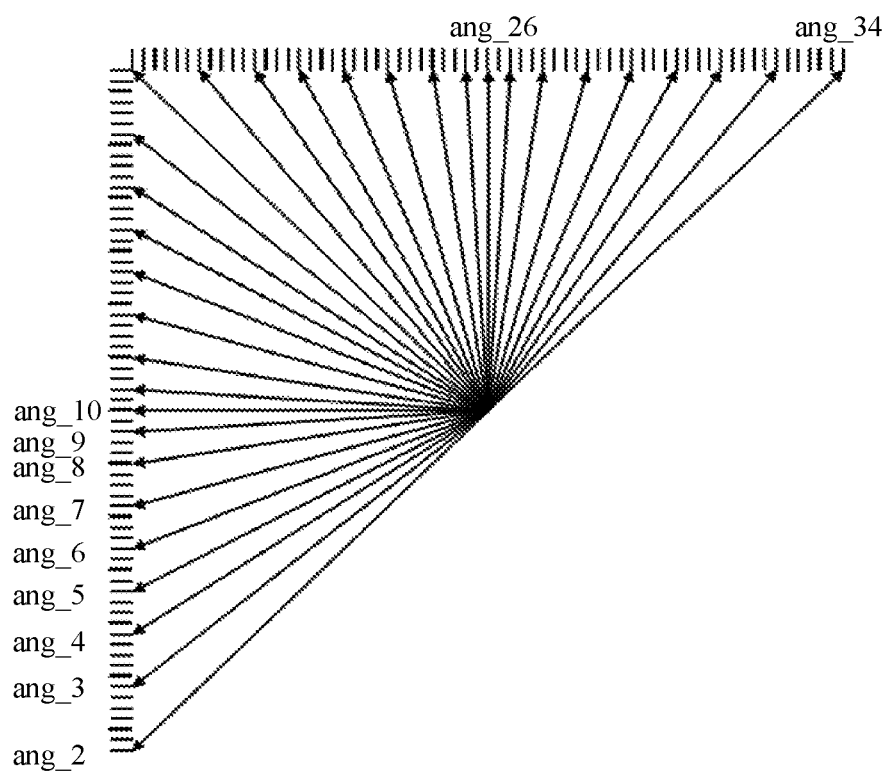
FIG. 1 is a schematic diagram illustrating 33 direction prediction modes involved in an intra-frame prediction mode provided in the disclosure.
Figure 2:
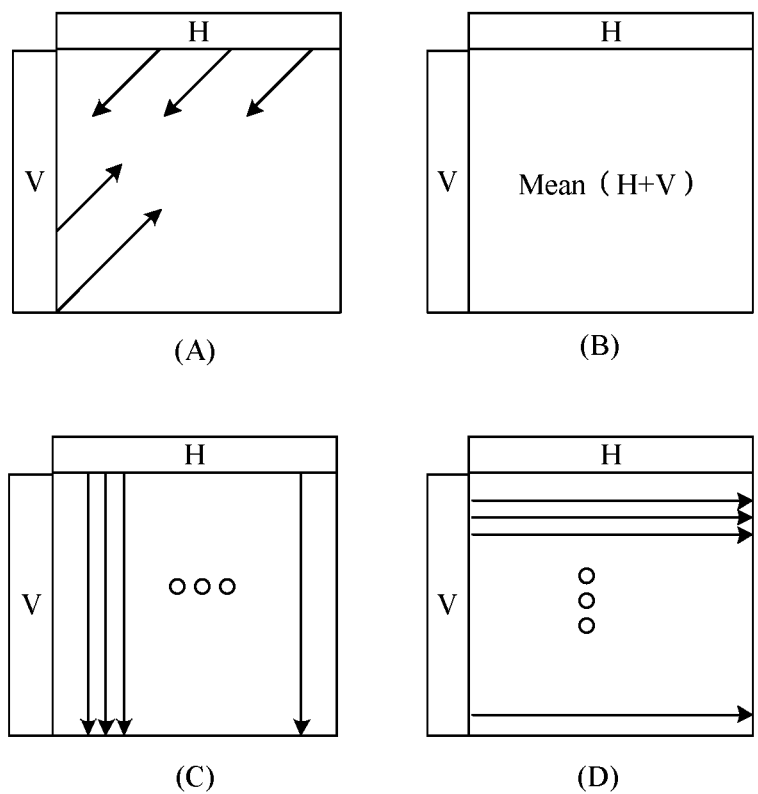
FIG. 2 is a schematic diagram illustrating principles of a Planar direction prediction mode, a Direct Current (DC) prediction mode, a vertical direction mode and a horizontal direction mode provided in the disclosure.

Intra-frame prediction mode: it is a prediction mode in which a prediction is carried out using a pixel that is in upper and/or left row with respect to the current prediction unit during an intra-frame prediction coding process. 35 intra-frame prediction modes are provided in HEVC, including a Planar prediction mode, a DC prediction mode and 33 direction prediction modes. The 33 direction prediction modes include an ang_2 direction prediction mode to an ang_34 direction prediction mode, wherein the ang_10 direction prediction mode is a horizontal direction prediction mode and the ang_26 direction prediction mode is a vertical direction prediction mode. Distributed clockwise by number, the directions range from a position whether the ang_2 direction forming a 45-degree angle with the vertical line to a position whether the ang_34 direction forming a 45-degree angle with the horizontal line, as shown in FIG. 1, in which:

the Planar prediction mode: it is a mode in which the corresponding pixel value of the current prediction unit is predicted using a bilinear interpolation algorithm based on a pixel H that is in upper row with respect to the current prediction unit and a pixel V that is in left row with respect to the current prediction unit, this mode is suitable for a region in which chromaticity changes smoothly, as shown in FIG. 2(A);

the DC prediction mode: it is a mode in which the corresponding pixel value of the current prediction unit is predicted using the Mean (H+V) of the pixel H that is in upper row with respect to the current prediction unit and the pixel H that is in left row with respect to the current prediction unit, as shown in FIG. 2(B);

The vertical direction mode: it is a mode in which the corresponding pixel value of the current prediction unit is predicted using a pixel H that is in upper row with respect to the current prediction unit, as shown in FIG. 2(C);

The horizontal direction mode: it is a mode in which the corresponding pixel value of the current prediction unit is predicted using a pixel V that is in left row with respect to the current prediction unit, as shown in FIG. 2(D).

Intra-frame prediction mode selection process: a process of selecting, for the current prediction unit, an intra-frame brightness prediction mode and then an intra-frame chromaticity prediction mode. The intra-frame brightness prediction mode and the intra-frame chromaticity prediction mode are both selected from 35 intra-frame prediction modes.

Figure 3:
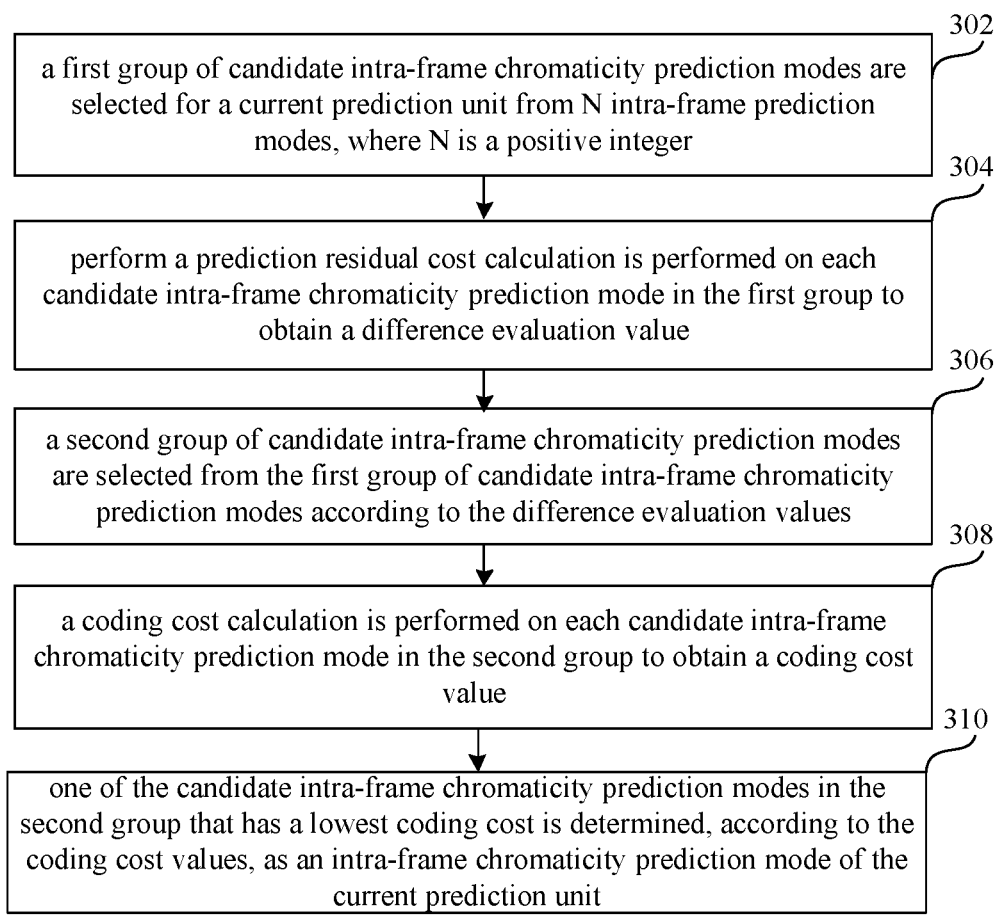
FIG. 3 is a flowchart illustrating a prediction mode selection method provided in an embodiment of the disclosure.

FIG. 3 is a flowchart illustrating a prediction mode selection method provided in an embodiment of the disclosure. The embodiment is described by taking the application of the prediction mode selection method to a video coding device as an example. The method includes the following steps:

Step 302: a first group of candidate intra-frame chromaticity prediction modes are selected for a current prediction unit from N intra-frame prediction modes, where N is a positive integer.

Step 304: a prediction residual cost calculation is performed on each candidate intra-frame chromaticity prediction mode in the first group to obtain a difference evaluation value.

The difference evaluation value may be any one of Hadamard absolute difference (HAD), Sum of Absolute Difference (SAD) and Sum of Absolute Transformed Difference (SATD).

Step 306: a second group of candidate intra-frame chromaticity prediction modes are selected from the first group of candidate intra-frame chromaticity prediction modes according to the difference evaluation values.

Optionally, the second group of candidate intra-frame chromaticity prediction modes is a proper subset of the first group of candidate intra-frame chromaticity prediction modes Step 308: a coding cost calculation is performed on each candidate intra-frame chromaticity prediction mode in the second group to obtain a coding cost value.

Step 310: one of the candidate intra-frame chromaticity prediction modes in the second group that has a lowest coding cost is determined, according to the coding cost values, as an intra-frame chromaticity prediction mode of the current prediction unit.

In conclusion, by obtaining the optimal intra-frame chromaticity prediction mode through a primary selection implemented by calculating prediction residual costs and a secondary selection implemented by calculating coding cost values, the prediction mode selection method provided in the embodiment solves the low calculation efficiency problem of the conventional art that is caused by the need of performing a coding cost value calculation on each candidate intra-frame chromaticity prediction mode, and consequentially effectively reduces the amount of calculation and improves coding efficiency as the calculation amount of difference evaluation values is ⅙-¼ of that of coding cost values.

Figure 4:
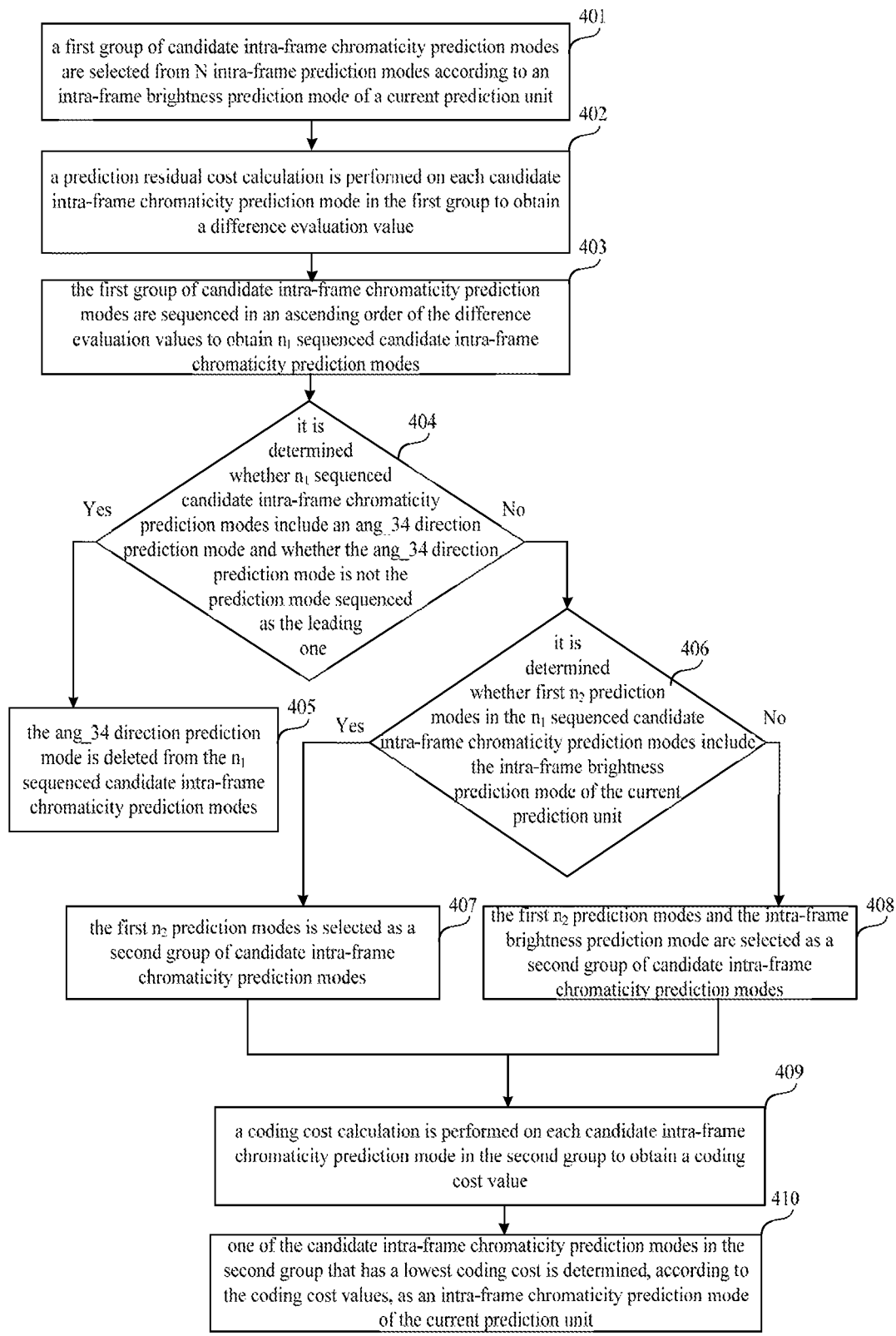
FIG. 4 is a flowchart illustrating a prediction mode selection method provided in another embodiment of the disclosure.

FIG. 4 is a flowchart illustrating a prediction mode selection method provided in another embodiment of the disclosure. The embodiment is described by taking the application of the prediction mode selection method to a video coding device as an example. The method includes the following steps:

Step 401: a first group of candidate intra-frame chromaticity prediction modes are selected from N intra-frame prediction modes according to an intra-frame brightness prediction mode of a current prediction unit.

During the intra-frame prediction mode selection process, an intra-frame brightness prediction mode is selected prior to an intra-frame chromaticity prediction mode. The selection of an intra-frame brightness prediction mode, which can be realized using existing methods, is not described in the embodiment. The intra-frame brightness prediction mode is a brightness prediction mode which is selected for the current prediction unit during an intra-frame brightness prediction mode selection process.

The selected intra-frame brightness prediction mode is used in this step as a guide for the selection of an intra-frame chromaticity prediction mode for the current prediction unit. Specifically, Step 401 includes any one of the following sub-step that:

the Planar mode, the DC mode and the horizontal prediction mode are taken as the first group of candidate intra-frame chromaticity prediction modes if the intra-frame brightness prediction mode is the horizontal prediction mode;

the Planar mode, the DC mode and the vertical prediction mode are taken as the first group of candidate intra-frame chromaticity prediction modes if the intra-frame brightness prediction mode is the vertical prediction mode;

the Planar mode, the DC mode, a first direction prediction mode and the horizontal prediction mode are taken as the first group of candidate intra-frame chromaticity prediction modes if the intra-frame brightness prediction mode is the first direction prediction mode and an included angle between a first direction corresponding to the first direction prediction mode and the horizontal direction is smaller than or equal to a first angle; optionally, the first angle is 5.625° (calculated by dividing 180° by 32), that is, the included angle between two adjacent ang direction prediction modes;

the Planar mode, the DC mode, a second direction prediction mode and the vertical prediction mode are taken as the first group of candidate intra-frame chromaticity prediction modes if the intra-frame brightness prediction mode is the second direction prediction mode and an included angle between a second direction corresponding to the second direction prediction mode and the vertical direction is smaller than or equal to a second angle; optionally, the second angle is 5.625° (calculated by dividing 180° by 32), that is, the included angle between two adjacent ang direction prediction modes; or the Planar mode, the DC mode, the horizontal prediction mode, the vertical prediction mode and a third direction prediction mode are taken as the first group of candidate intra-frame chromaticity prediction modes if the intra-frame brightness prediction mode is the third direction prediction mode, an included angle between a third direction corresponding to the third direction prediction mode and the horizontal direction is greater than the first angle and the included angle between the third direction and the vertical direction is greater than the second angle, wherein the first direction, the second direction and the third direction each refer to any one of 33 directions ranging from ang_2 direction to ang_34 direction except the horizontal direction and the vertical direction.

Step 402: a prediction residual cost calculation is performed on each candidate intra-frame chromaticity prediction mode in the first group to obtain a difference evaluation value.

The difference evaluation value may be any one of HAD, SAD, SATD, Sum of Squared Difference (SSD) and Sum of Square Error (SSE).

A prediction residual cost calculation is separately performed on each of the four or five candidate intra-frame chromaticity prediction modes in the first group to obtain the difference evaluation value of each prediction mode.

Step 403: the first group of candidate intra-frame chromaticity prediction modes are sequenced in an ascending order of the difference evaluation values to obtain $n_1$ sequenced candidate intra-frame chromaticity prediction modes.

Optionally, $n_1$ is 4 or 5.

The sequenced candidate intra-frame chromaticity prediction modes may be marked by candidate_1[0], candidate_1[1], candidate_1[2], candidate_1[3] and candidate_1[4].

Step 404: it is determined whether $n_1$ sequenced candidate intra-frame chromaticity prediction modes include an ang_34 direction prediction mode and whether the ang_34 direction prediction mode is not the prediction mode sequenced as the leading one.

If the $n_1$ sequenced candidate intra-frame chromaticity prediction modes include the ang_34 direction prediction mode and the ang_34 direction prediction mode is not sequenced as the leading one, the flow proceeds to Step 405;

if the $n_1$ sequenced candidate intra-frame chromaticity prediction modes do not include the ang_34 direction prediction mode or if the $n_1$ sequenced candidate intra-frame chromaticity prediction modes include the ang_34 direction prediction mode and the ang_34 direction prediction mode is the prediction mode sequenced as the leading one, the flow proceeds to Step 406.

Step 405: the ang_34 direction prediction mode is deleted from the $n_1$ sequenced candidate intra-frame chromaticity prediction modes if the $n_1$ sequenced candidate intra-frame chromaticity prediction modes include the ang_34 direction prediction mode and the ang_34 direction prediction mode is not the prediction mode sequenced as the leading one.

According to experimental data, it is less likely that the ang_34 direction prediction mode is determined as the optimal intra-frame chromaticity prediction mode, thus, the deletion of the ang_34 direction prediction mode which is not sequenced as the leading one from the $n_1$ sequenced candidate intra-frame chromaticity prediction modes reduces the amount of the calculation carried out in Step 407.

It should be understood that Steps 404 and 405 are optional.

Step 406: it is determined whether first $n_2$ prediction modes in the $n_1$ sequenced candidate intra-frame chromaticity prediction modes include the intra-frame brightness prediction mode of the current prediction unit if the n1 sequenced candidate intra-frame chromaticity prediction modes do not include the ang_34 direction prediction mode or if the $n_1$ sequenced candidate intra-frame chromaticity prediction modes include the ang_34 direction prediction mode but the ang_34 direction prediction mode is the prediction mode sequenced as the leading one, wherein $n_2$ is smaller than $n_1$.

Optionally, $n_2$ is 2.

That is, it is determined whether the prediction modes corresponding to candidate_1[0] and candidate_1[1] include the intra-frame brightness prediction mode of the current prediction unit.

Step 407: the first $n_2$ prediction modes are selected as a second group of candidate intra-frame chromaticity prediction modes if the first $n_2$ prediction modes in the $n_1$ sequenced candidate intra-frame chromaticity prediction modes include the intra-frame brightness prediction mode of the current prediction unit.

If the prediction modes corresponding to candidate_1[0] and candidate_1[1] include the intra-frame brightness prediction mode of the current prediction unit, then the prediction modes corresponding to candidate_1[0] and candidate_1[1] are selected as a second group of candidate intra-frame chromaticity prediction modes.

Step 408: the first $n_2$ prediction modes and the intra-frame brightness prediction mode are selected as a second group of candidate intra-frame chromaticity prediction modes if the first $n_2$ prediction modes do not include the intra-frame brightness prediction mode of the current prediction unit.

If the prediction modes corresponding to candidate_1[0] and candidate_1[1] include the intra-frame brightness prediction mode of the current prediction unit, then the prediction modes corresponding to candidate_1[0] and candidate_1[1] and the intra-frame brightness prediction mode of the current prediction unit are selected as a second group of candidate intra-frame chromaticity prediction modes.

Step 409: a coding cost calculation is performed on each candidate intra-frame chromaticity prediction mode in the second group to obtain a coding cost value.

Optionally, the coding cost value is represented by a code rate resulting from a coding process and a distortion rate of reconstructed image frames. The calculation of the coding cost value, which is well mastered by those skilled in the art, is described briefly below.

The calculation of a code rate resulting from a coding process includes: carrying out, with respect to the current candidate intra-frame chromaticity prediction mode, a transformation processing, a quantization processing and an entropy coding processing for the difference evaluation value calculated in Step 302 to obtain a coded code stream and calculating the code rate resulting from the coding according to the code stream.

The calculation of the distortion rate of reconstructed image frames includes: carrying out, with respect to the current candidate intra-frame chromaticity prediction mode, an inverse quantization processing and an inverse transformation processing for the current prediction unit to obtain a reconstructed image frame and comparing the reconstructed image frame with the real frame in which the current prediction unit exists so as to calculate a distortion rate. Optionally, the distortion rate can be calculated using Rate Distortion Opitmization (RDO).

Step 410: one of the candidate intra-frame chromaticity prediction modes in the second group that has a lowest coding cost is determined, according to the coding cost values, as the intra-frame chromaticity prediction mode of the current prediction unit.

At last, one of the candidate intra-frame chromaticity prediction modes in the second group that has a lowest coding cost is determined as the intra-frame chromaticity prediction mode of the current prediction unit.

In conclusion, by obtaining the optimal intra-frame chromaticity prediction mode through a primary selection implemented by calculating prediction residual costs and a secondary selection implemented by calculating coding cost values, the prediction mode selection method provided in the embodiment solves the low calculation efficiency problem of the conventional art that is caused by the need of performing a coding cost value calculation on each candidate intra-frame chromaticity prediction mode, and consequentially effectively reduces the amount of calculation and improves coding efficiency as the calculation amount of difference evaluation values is ⅙-¼ of that of coding cost values.

By providing a guide for the selection of a first group of candidate intra-frame chromaticity prediction modes based on the intra-frame brightness prediction mode of the current prediction unit, the prediction mode selection method provided in the embodiment guarantees the accuracy of the selection of the first group of candidate intra-frame chromaticity prediction modes.

By discarding the ang_34 direction prediction mode in some cases, the prediction mode selection method provided in the embodiment reduces the amount of calculation of coding cost values further and therefore improves coding efficiency.

Embodiments of the apparatus provided herein are described below, and the details of the embodiments that are not specified below can be understood with reference to the foregoing methods in a one-to-one correspondence way.

Figure 5:
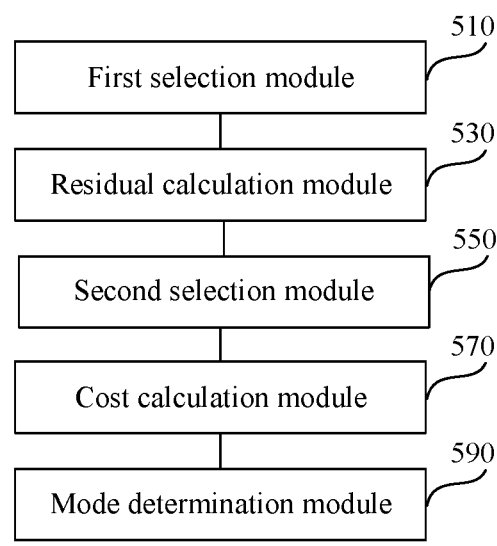
FIG. 5 is a schematic diagram illustrating the structure of a prediction mode selection apparatus provided in an embodiment of the disclosure.

FIG. 5 is a block diagram illustrating the structure of a prediction mode selection apparatus provided in an embodiment of the disclosure. By means of software, hardware or the combinations thereof, the prediction mode selection apparatus can function as a part of or a whole video coding apparatus. The apparatus includes:

a first selection module 510 configured to select, for the current prediction unit, a first group of candidate intra-frame chromaticity prediction modes from N intra-frame prediction modes, wherein N is a positive integer;

a residual calculation module 530 configured to perform a prediction residual cost calculation on each candidate intra-frame chromaticity prediction mode in the first group to obtain a difference evaluation value;

a second selection module 550 configured to select a second group of candidate intra-frame chromaticity prediction modes from the first group of candidate intra-frame chromaticity prediction modes according to the difference evaluation values; optionally, the second group of candidate intra-frame chromaticity prediction modes is a proper subset of the first group of candidate intra-frame chromaticity prediction modes;

a cost calculation module 570 configured to perform a coding cost calculation on each candidate intra-frame chromaticity prediction mode in the second group to obtain a coding cost value; and a mode determination module 590 configured to determine, according to the coding cost values, one of the candidate intra-frame chromaticity prediction modes in the second group that has a lowest coding cost, as an intra-frame chromaticity prediction mode of the current prediction unit.

In conclusion, by obtaining the optimal intra-frame chromaticity prediction mode through a primary selection implemented by calculating prediction residual costs and a secondary selection implemented by calculating coding cost values, the prediction mode selection apparatus provided in the embodiment solves the low calculation efficiency problem of the conventional art that is caused by the need of performing a coding cost value calculation on each candidate intra-frame chromaticity prediction mode and consequentially effectively reduces the amount of calculation and improves coding efficiency as the calculation amount of difference evaluation values is ⅙-¼ of that of coding cost values.

Figure 6:
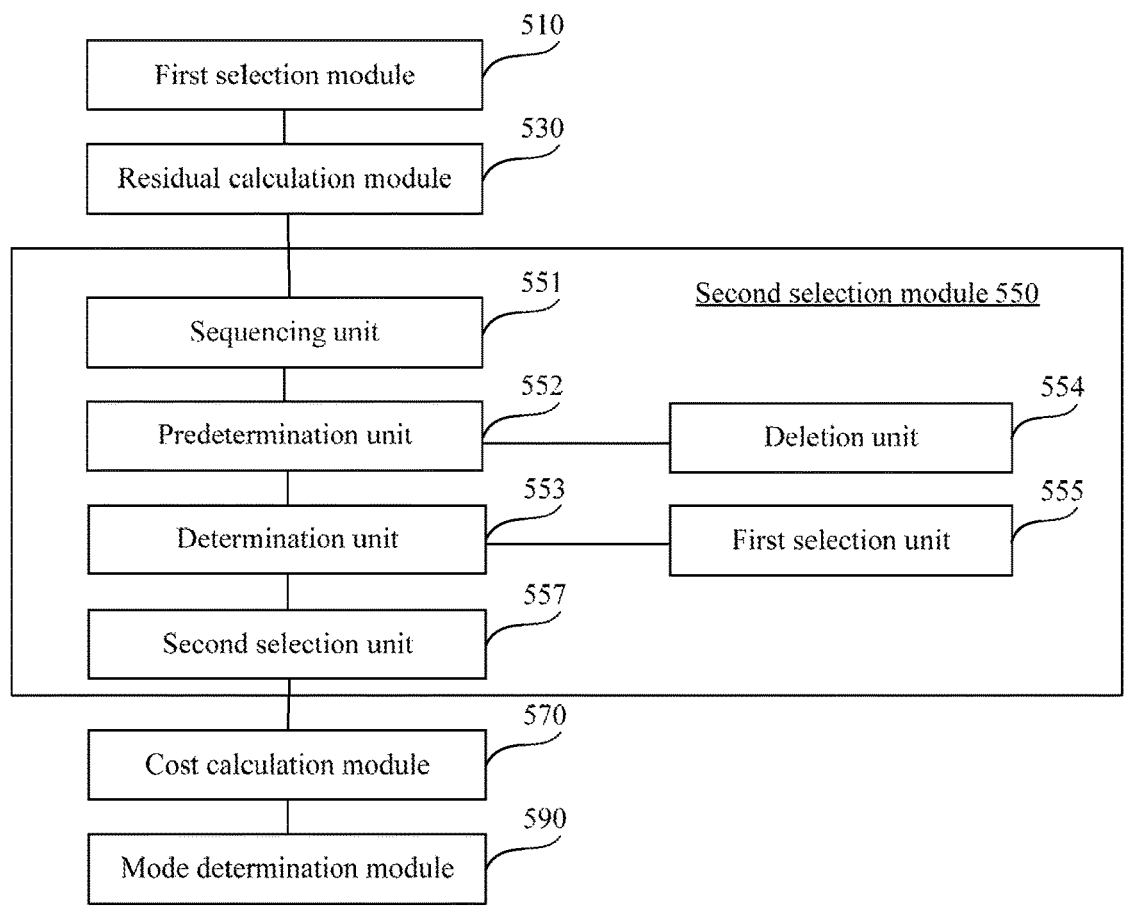
FIG. 6 is a schematic diagram illustrating the structure of a prediction mode selection apparatus provided in another embodiment of the disclosure.

FIG. 6 is a block diagram illustrating the structure of a prediction mode selection apparatus provided in an embodiment of the disclosure. By means of software, hardware or the combinations thereof, the prediction mode selection apparatus can function as a part of or a whole video coding apparatus. The apparatus includes:

a first selection module 510 configured to select, for the current prediction unit, a first group of candidate intra-frame chromaticity prediction modes from N intra-frame prediction modes, wherein N is a positive integer;

a residual calculation module 530 configured to perform a prediction residual cost calculation on each candidate intra-frame chromaticity prediction mode in the first group to obtain a difference evaluation value;

a second selection module 550 configured to select a second group of candidate intra-frame chromaticity prediction modes from the first group of candidate intra-frame chromaticity prediction modes according to the difference evaluation values, optionally; the second group of candidate intra-frame chromaticity prediction modes is a proper subset of the first group of candidate intra-frame chromaticity prediction modes;

a cost calculation module 570 configured to perform a coding cost calculation on each candidate intra-frame chromaticity prediction mode in the second group to obtain a coding cost value; and a mode determination module 590 configured to determine, according to the coding cost values, one of the candidate intra-frame chromaticity prediction modes in the second group that has a lowest coding cost, as an intra-frame chromaticity prediction mode of the current prediction unit.

Optionally, the first selection module 510 is configured to select a first group of candidate intra-frame chromaticity prediction modes from N intra-frame prediction modes according to the intra-frame brightness prediction mode of the current prediction unit.

Optionally, the first selection module 510 is configured to:

take the Planar mode, the DC mode and the horizontal prediction mode as the first group of candidate intra-frame chromaticity prediction modes if the intra-frame brightness prediction mode is the horizontal prediction mode;

take the Planar mode, the DC mode and the vertical prediction mode as the first group of candidate intra-frame chromaticity prediction modes if the intra-frame brightness prediction mode is the vertical prediction mode;

take the Planar mode, the DC mode, a first direction prediction mode and the horizontal prediction mode as the first group of candidate intra-frame chromaticity prediction modes if the intra-frame brightness prediction mode is the first direction prediction mode and an included angle between a first direction corresponding to the first direction prediction mode and the horizontal direction is smaller than or equal to a first angle;

take the Planar mode, the DC mode, a second direction prediction mode and the vertical prediction mode as the first group of candidate intra-frame chromaticity prediction modes if the intra-frame brightness prediction mode is the second direction prediction mode and an included angle between a second direction corresponding to the second direction prediction mode and the vertical direction is smaller than or equal to a second angle; or take the Planar mode, the DC mode, the horizontal prediction mode, the vertical prediction mode and a third direction prediction mode as the first group of candidate intra-frame chromaticity prediction modes if the intra-frame brightness prediction mode is the third direction prediction mode, an included angle between a third direction corresponding to the third direction prediction mode and the horizontal direction is greater than the first angle and the included angle between the third direction and the vertical direction is greater than the second angle, wherein the first direction, the second direction and the third direction each refer to any one of 33 directions ranging from ang_2 direction to ang_34 direction except the horizontal direction and the vertical direction.

Optionally, the second selection module 550 includes:

a sequencing unit 551 configured to sequence the first group of candidate intra-frame chromaticity prediction modes in an ascending order of the difference evaluation values to obtain $n_1$ sequenced candidate intra-frame chromaticity prediction modes;

a determination unit 553 configured to determine whether first $n_2$ prediction modes in the $n_1$ sequenced candidate intra-frame chromaticity prediction modes include the intra-frame brightness prediction mode of the current prediction unit, wherein $n_2$ is smaller than $n_1$;

a first selection unit 555 configured to select the first $n_2$ prediction modes as the second group of candidate intra-frame chromaticity prediction modes if the first $n_2$ prediction modes in the $n_1$ sequenced candidate intra-frame chromaticity prediction modes include the intra-frame brightness prediction mode of the current prediction unit; and a second selection unit 557 configured to select the first $n_2$ prediction modes and the intra-frame brightness prediction mode as the second group of candidate intra-frame chromaticity prediction modes if the first $n_2$ prediction modes in the $n_1$ sequenced candidate intra-frame chromaticity prediction modes do not include the intra-frame brightness prediction mode of the current prediction unit.

Optionally, the second selection module 550 includes:

a predetermination unit 552 configured to determine whether the $n_1$ sequenced candidate intra-frame chromaticity prediction modes include the ang_34 direction prediction mode and whether the ang_34 direction prediction mode is not the prediction mode sequenced as the leading one;

a deletion unit 554 configured to delete the ang_34 direction prediction mode from the $n_1$ sequenced candidate intra-frame chromaticity prediction modes if the $n_1$ sequenced candidate intra-frame chromaticity prediction modes include the ang_34 direction prediction mode and the ang_34 direction prediction mode is not the prediction mode sequenced as the leading one; and a determination unit 553 configured to determine whether the first $n_2$ prediction modes in the $n_1$ sequenced candidate intra-frame chromaticity prediction modes include the intra-frame brightness prediction mode if the $n_1$ sequenced candidate intra-frame chromaticity prediction modes do not include the ang_34 direction prediction mode or if the $n_1$ sequenced candidate intra-frame chromaticity prediction modes include the ang_34 direction prediction mode but the ang_34 direction prediction mode is the prediction mode sequenced as the leading one.

In conclusion, by obtaining the optimal intra-frame chromaticity prediction mode through a primary selection implemented by calculating prediction residual costs and a secondary selection implemented by calculating coding cost values, the prediction mode selection apparatus provided in the embodiment solves the low calculation efficiency problem of the conventional art that is caused by the need of performing a coding cost value calculation on each candidate intra-frame chromaticity prediction mode, and consequentially effectively reduces the amount of calculation and improves coding efficiency as the calculation amount of difference evaluation values is $\frac{1}{6}$-$\frac{1}{4}$ of that of coding cost values.

By providing a guide for the selection of a first group of candidate intra-frame chromaticity prediction modes based on the intra-frame brightness prediction mode of the current prediction unit, the prediction mode selection apparatus provided in the embodiment guarantees the accuracy of the selection of the first group of candidate intra-frame chromaticity prediction modes.

By discarding the ang_34 direction prediction mode in some cases, the prediction mode selection apparatus provided in the embodiment reduces the amount of calculation of coding cost values further and therefore improves coding efficiency.

It should be noted that although the selection of an intra-frame chromaticity prediction mode by the prediction mode selection apparatuses provided in the foregoing embodiments is described above by taking the division of functional modules as an example, these functions may be assigned to different functional modules in practical application, that is, the internal structure of the apparatus may be divided into different functional modules to achieve all or a part of the functions described above. Moreover, as the prediction mode selection apparatuses provided in the foregoing embodiments are based on the same concept with the foregoing prediction mode selection method, the specific implementation of the prediction mode selection apparatuses can be understood with reference to embodiments of the foregoing prediction mode selection method and is therefore not described here repeatedly.

Figure 7:
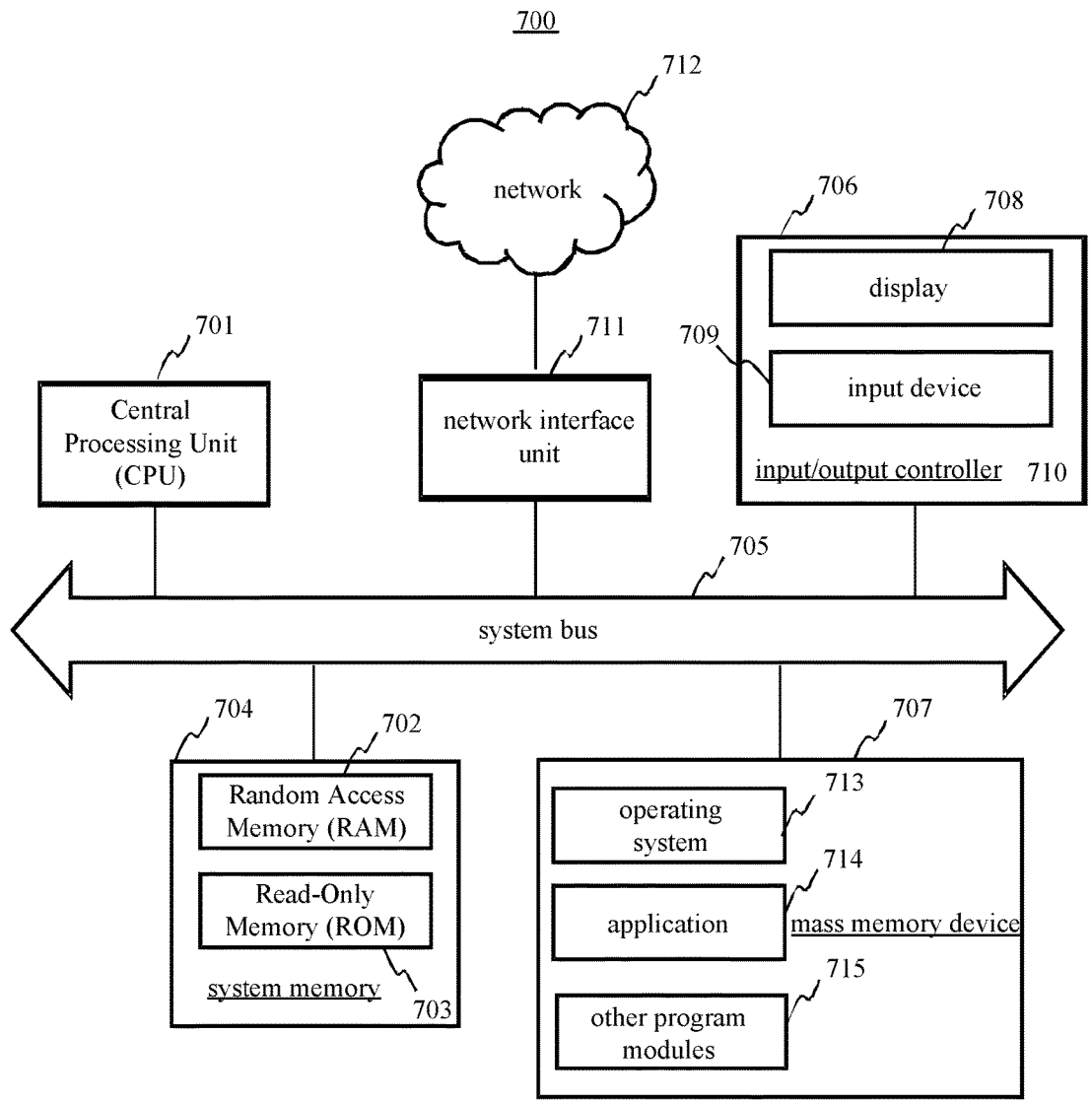
FIG. 7 is a schematic diagram illustrating the structure of a video coding device provided in another embodiment of the disclosure.

FIG. 7 is a schematic diagram illustrating the structure of a video coding device provided in an embodiment of the disclosure. The video coding device may be a mobile phone, a tablet PC, a desktop or a server. Specifically, a video coding device 700 includes a Central Processing Unit (CPU) 701, a system memory 704 including a Random Access Memory (RAM) 702 and a Read-Only Memory (ROM) 703 and a system bus 702 for connecting the system memory 704 with the CPU 701. The video coding device 700 further includes a basic Input/Output (I/O) system 706 for assisting in the information transmission between the elements in a computer and a mass memory 707 for storing an operating system 713, an application 714 and other program modules 715.

The basic I/O system 706 includes a display 708 for displaying information and an input device 709, for example, a mouse or a keyboard, for the user to input information. The display 708 and the input device 709 are both connected with the CPU 701 through an input/output controller 710 which is connected with the system bus 705. The basic I/O system 706 may further include the input/output controller 710 which is configured to receive and process the information input from a keyboard, a mouse, an electronic stylus or other devices. Similarly, the input/output controller 710 further outputs information to a display screen, a printer or other types of output devices.

The mass memory 707 is connected with the CPU 701 through a mass storage controller (not shown) which is connected with the system bus 705. The mass memory 707 and computer-readable mediums related thereto provide nonvolatile storage for the video coding device 700. That is, the mass memory 707 may include a computer-readable medium (not shown) such as a hard disk or a CD-ROM drive.

Without loss of generality, the computer-readable medium may include a computer storage medium and a communication medium. The computer storage medium includes a volatile/nonvolatile or a movable/unmovable medium implemented using any method or technology for storing information such as computer-readable instructions, data structure, program modules or other data. The computer storage medium includes a solid state memory such as RAM, ROM, EPROM, EEPROM and flash memory or an optical memory such as CD-ROM and DVD or a magnetic memory such as a cassette, a magnetic tape and a magnetic disk. It is apparent for those skilled in the art that the computer storage medium is not limited to those mentioned above. The system memory 704 and the mass memory 707 can be collectively referred to as 'memory'.

According to the various embodiments of the disclosure, the video coding device 700 may be further be run by a remote computer which is connected with a network via a network such as the Internet. That is, the video coding device 700 may be connected with a network 712 via a network interface unit 711 connected with the system bus 705, in other words, the video coding device 700 may be connected with another type of network or remote computer system (not shown) by the network interface unit 711.

The memory further include one or more programs which are stored in the memory and executed by the CPU to execute the prediction mode selection method shown in FIG. 3 or FIG. 4.

An non-temporary computer-readable storage medium in which instructions are included, for example, a memory in which instructions are included, is also provided in an exemplary embodiment, wherein the instructions may be executed by the processor of a video coding device to execute the prediction mode selection method shown in FIG. 3 or FIG. 4. For example, the non-temporary computer-readable storage medium is an ROM, an RAM, a CD-ROM, a magnetic tape, a floppy disk or an optical data storage device.

The embodiments of the disclosure are merely numbered for the sake of description but not for the representation of the superiority of the embodiments.

It should be appreciated by those of ordinary skill in the art that all or a part of the steps that are executed to realize the foregoing embodiments can be executed by a piece of hardware or by a piece of hardware instructed by a program stored in a computer-readable storage medium which may refer to an ROM, a magnetic disk or a compact disc.

Although preferred embodiments of the disclosure have been illustrated herein, it should be appreciated that the embodiments are not to be construed as limiting the disclosure and any modification, equivalent substitute or improvement that can be devised without departing from the spirit and principle of the disclosure shall fall within the protection scope of the disclosure.

What is claimed is:

1. A prediction mode selection method, comprising:
selecting, for a current prediction unit, a first group of candidate intra-frame chromaticity prediction modes from N intra-frame prediction modes, wherein N is a positive integer;
performing a prediction residual cost calculation on each candidate intra-frame chromaticity prediction mode in the first group to obtain a difference evaluation value;
selecting a second group of candidate intra-frame chromaticity prediction modes from the first group of candidate intra-frame chromaticity prediction modes according to the difference evaluation values, wherein the second group of candidate intra-frame chromaticity prediction modes is a proper subset of the first group of candidate intra-frame chromaticity prediction modes;
performing a coding cost calculation on each candidate intra-frame chromaticity prediction mode in the second group to obtain a coding cost value; and
determining, according to the coding cost values, one of the candidate intra-frame chromaticity prediction modes in the second group that has a lowest coding cost, as an intra-frame chromaticity prediction mode of the current prediction unit;
wherein selecting the second group of candidate intra-frame chromaticity prediction modes from the first group of candidate intra-frame chromaticity prediction modes according to the difference evaluation values comprises:
sequencing the first group of candidate intra-frame chromaticity prediction modes in an ascending order of the difference evaluation values to obtain n1 sequenced candidate intra-frame chromaticity prediction modes;
determining whether first n2 prediction modes in the n1 sequenced candidate intra-frame chromaticity prediction modes include an intra-frame brightness prediction mode of the current prediction unit, wherein n2 is smaller than n1;
selecting the first n2 prediction modes as the second group of candidate intra-frame chromaticity prediction modes if the first n2 prediction modes in the n1 sequenced candidate intra-frame chromaticity prediction modes include the intra-frame brightness prediction mode of the current prediction unit;
selecting the first n2 prediction modes and the intra-frame brightness prediction mode as the second group of candidate intra-frame chromaticity prediction modes if the first n2 prediction modes in the n1 sequenced candidate intra-frame chromaticity prediction modes do not include the intra-frame brightness prediction mode of the current prediction unit.

2. The method according to claim 1, wherein selecting, for the current prediction unit, the first group of candidate intra-frame chromaticity prediction modes from N intra-frame prediction modes comprises:
selecting the first group of candidate intra-frame chromaticity prediction modes from N intra-frame prediction modes according to an intra-frame brightness prediction mode of the current prediction unit.

3. The method according to claim 2, wherein selecting the first group of candidate intra-frame chromaticity prediction modes from N intra-frame prediction modes according to the intra-frame brightness prediction mode of the current prediction unit comprises:
taking a Planar mode, a Direct Current (DC) mode and a horizontal prediction mode as the first group of candidate intra-frame chromaticity prediction modes if the intra-frame brightness prediction mode is the horizontal prediction mode;
taking the Planar mode, the DC mode and a vertical prediction mode as the first group of candidate intra-frame chromaticity prediction modes if the intra-frame brightness prediction mode is the vertical prediction mode;
taking the Planar mode, the DC mode, a first direction prediction mode and the horizontal prediction mode as the first group of candidate intra-frame chromaticity prediction modes if the intra-frame brightness prediction mode is the first direction prediction mode and an included angle between a first direction corresponding to the first direction prediction mode and the horizontal direction is smaller than or equal to a first angle;
taking the Planar mode, the DC mode, a second direction prediction mode and the vertical prediction mode as the first group of candidate intra-frame chromaticity prediction modes if the intra-frame brightness prediction mode is the second direction prediction mode and an included angle between a second direction corresponding to the second direction prediction mode and the vertical direction is smaller than or equal to a second angle;

taking the Planar mode, the DC mode, the horizontal prediction mode, the vertical prediction mode and a third direction prediction mode as the first group of candidate intra-frame chromaticity prediction modes if the intra-frame brightness prediction mode is the third direction prediction mode, an included angle between a third direction corresponding to the third direction prediction mode and the horizontal direction is greater than the first angle and an included angle between the third direction and the vertical direction is greater than the second angle, wherein the first direction, the second direction and the third direction each refer to any one of 33 directions ranging from ang_2 direction to ang_34 direction except the horizontal direction and the vertical direction.

4. The method according to claim 1, further comprising:
before determining whether the first nz prediction modes in the $n_1$ sequenced candidate intra-frame chromaticity prediction modes include the intra-frame brightness prediction mode of the current prediction unit,
  determining whether the $n_1$ sequenced candidate intra-frame chromaticity prediction modes include an ang_34 direction prediction mode and whether the ang_34 direction prediction mode is not the prediction mode sequenced as the leading one;
  deleting the ang_34 direction prediction mode from the $n_1$ sequenced candidate intra-frame chromaticity prediction modes if the $n_1$ sequenced candidate intra-frame chromaticity prediction modes include the ang_34 direction prediction mode and the ang_34 direction prediction mode is not the prediction mode sequenced as the leading one;
  determining whether the first nz prediction modes in the $n_1$ sequenced candidate intra-frame chromaticity prediction modes include the intra-frame brightness prediction mode if the $n_1$ sequenced candidate intra-frame chromaticity prediction modes do not include the ang_34 direction prediction mode or if the $n_1$ sequenced candidate intra-frame chromaticity prediction modes include the ang_34 direction prediction mode but the ang_34 direction prediction mode is the prediction mode sequenced as the leading one.

5. A video coding device, comprising:
one or more processors; and
a memory in which one or more programs are stored, wherein the one or more programs are configured to be executed by the one or more processors and comprise instructions for executing the following operations of:
selecting, for a current prediction unit, a first group of candidate intra-frame chromaticity prediction modes from N intra-frame prediction modes, wherein N is a positive integer;
performing a prediction residual cost calculation on each candidate intra-frame chromaticity prediction mode in the first group to obtain a difference evaluation value;
selecting a second group of candidate intra-frame chromaticity prediction modes from the first group of candidate intra-frame chromaticity prediction modes according to the difference evaluation values, wherein the second group of candidate intra-frame chromaticity prediction modes is a proper subset of the first group of candidate intra-frame chromaticity prediction modes;

performing a coding cost calculation on each candidate intra-frame chromaticity prediction mode in the second group to obtain a coding cost value; and
determining, according to the coding cost values, one of the candidate intra-frame chromaticity prediction modes in the second group that has a lowest coding cost, as an intra-frame chromaticity prediction mode of the current prediction unit;
wherein the one or more programs further include instructions for executing the following operations of:
sequencing the first group of candidate intra-frame chromaticity prediction modes in an ascending order of the difference evaluation values to obtain n1 sequenced candidate intra-frame chromaticity prediction modes;
determining whether first n2 prediction modes in the n1 sequenced candidate intra-frame chromaticity prediction modes include an intra-frame brightness prediction mode of the current prediction unit, wherein n2 is smaller than n1;
selecting the first n2 prediction modes as the second group of candidate intra-frame chromaticity prediction modes if the first n2 prediction modes in the n1 sequenced candidate intra-frame chromaticity prediction modes include the intra-frame brightness prediction mode of the current prediction unit;
selecting the first n2 prediction modes and the intra-frame brightness prediction mode as the second group of candidate intra-frame chromaticity prediction modes if the first n2 prediction modes in the n1 sequenced candidate intra-frame chromaticity prediction modes do not include the intra-frame brightness prediction mode of the current prediction unit.

6. The device according to claim 5, wherein the one or more programs further comprise instructions for executing the following operation of:
selecting the first group of candidate intra-frame chromaticity prediction modes from N intra-frame prediction modes according to an intra-frame brightness prediction mode of the current prediction unit.

7. The device according to claim 6, wherein the one or more programs further comprise instructions for executing the following operations of:
taking a Planar mode, a Direct Current (DC) mode and a horizontal prediction mode as the first group of candidate intra-frame chromaticity prediction modes if the intra-frame brightness prediction mode is the horizontal prediction mode;
taking the Planar mode, the DC mode and a vertical prediction mode as the first group of candidate intra-frame chromaticity prediction modes if the intra-frame brightness prediction mode is the vertical prediction mode;
taking the Planar mode, the DC mode, a first direction prediction mode and the horizontal prediction mode as the first group of candidate intra-frame chromaticity prediction modes if the intra-frame brightness prediction mode is the first direction prediction mode and an included angle between a first direction corresponding to the first direction prediction mode and the horizontal direction is smaller than or equal to a first angle;
taking the Planar mode, the DC mode, a second direction prediction mode and the vertical prediction mode as the first group of candidate intra-frame chromaticity prediction modes if the intra-frame brightness prediction mode is the second direction prediction mode and an included angle between a second direction corresponding to the second direction prediction mode and the vertical direction is smaller than or equal to a second angle;

taking the Planar mode, the DC mode, the horizontal prediction mode, the vertical prediction mode and a third direction prediction mode as the first group of candidate intra-frame chromaticity prediction modes if the intra-frame brightness prediction mode is the third direction prediction mode, an included angle between a third direction corresponding to the third direction prediction mode and the horizontal direction is greater than the first angle and an included angle between the third direction and the vertical direction is greater than the second angle, wherein the first direction, the second direction and the third direction each refer to any one of 33 directions ranging from ang_2 direction to ang_34 direction except the horizontal direction and the vertical direction.

8. The device according to claim 5, wherein the one or more programs further include instructions for executing the following operations of:

determining whether $n_1$ sequenced candidate intra-frame chromaticity prediction modes include an ang_34 direction prediction mode and whether the ang_34 direction prediction mode is not the prediction mode sequenced as the leading one;

deleting the ang_34 direction prediction mode from the $n_1$ sequenced candidate intra-frame chromaticity prediction modes if the $n_1$ sequenced candidate intra-frame chromaticity prediction modes include the ang_34 direction prediction mode and the ang_34 direction prediction mode is not the prediction mode sequenced as the leading one;

determining whether the first nz prediction modes in the $n_1$ sequenced candidate intra-frame chromaticity prediction modes include the intra-frame brightness prediction mode if the $n_1$ sequenced candidate intra-frame chromaticity prediction modes do not include the ang_34 direction prediction mode or if the $n_1$ sequenced candidate intra-frame chromaticity prediction modes include the ang_34 direction prediction mode but the ang_34 direction prediction mode is the prediction mode sequenced as the leading one.

9. A non-transitory computer-readable storage medium having stored therein instructions that, when executed by a processor of a video coding device, cause the video coding device to perform a prediction mode selection method, the method comprising:

selecting, for a current prediction unit, a first group of candidate intra-frame chromaticity prediction modes from N intra-frame prediction modes, wherein N is a positive integer;

performing a prediction residual cost calculation on each candidate intra-frame chromaticity prediction mode in the first group to obtain a difference evaluation value;

selecting a second group of candidate intra-frame chromaticity prediction modes from the first group of candidate intra-frame chromaticity prediction modes according to the difference evaluation values, wherein the second group of candidate intra-frame chromaticity prediction modes is a proper subset of the first group of candidate intra-frame chromaticity prediction modes;

performing a coding cost calculation on each candidate intra-frame chromaticity prediction mode in the second group to obtain a coding cost value; and determining, according to the coding cost values, one of the candidate intra-frame chromaticity prediction modes in the second group that has a lowest coding cost, as an intra-frame chromaticity prediction mode of the current prediction unit;

wherein selecting the second group of candidate intra-frame chromaticity prediction modes from the first group of candidate intra-frame chromaticity prediction modes according to the difference evaluation values comprises:

sequencing the first group of candidate intra-frame chromaticity prediction modes in an ascending order of the difference evaluation values to obtain n1 sequenced candidate intra-frame chromaticity prediction modes;

determining whether first n2 prediction modes in the n1 sequenced candidate intra-frame chromaticity prediction modes include an intra-frame brightness prediction mode of the current prediction unit, wherein n2 is smaller than n1;

selecting the first n2 prediction modes as the second group of candidate intra-frame chromaticity prediction modes if the first n2 prediction modes in the n1 sequenced candidate intra-frame chromaticity prediction modes include the intra-frame brightness prediction mode of the current prediction unit;

selecting the first n2 prediction modes and the intra-frame brightness prediction mode as the second group of candidate intra-frame chromaticity prediction modes if the first n2 prediction modes in the n1 sequenced candidate intra-frame chromaticity prediction modes do not include the intra-frame brightness prediction mode of the current prediction unit.

10. The non-transitory computer-readable storage medium according to claim 9, wherein selecting, for the current prediction unit, the first group of candidate intra-frame chromaticity prediction modes from N intra-frame prediction modes comprises:

selecting the first group of candidate intra-frame chromaticity prediction modes from N intra-frame prediction modes according to an intra-frame brightness prediction mode of the current prediction unit.

11. The non-transitory computer-readable storage medium according to claim 10, wherein selecting the first group of candidate intra-frame chromaticity prediction modes from N intra-frame prediction modes according to the intra-frame brightness prediction mode of the current prediction unit comprises:

taking a Planar mode, a Direct Current (DC) mode and a horizontal prediction mode as the first group of candidate intra-frame chromaticity prediction modes if the intra-frame brightness prediction mode is the horizontal prediction mode;

taking the Planar mode, the DC mode and a vertical prediction mode as the first group of candidate intra-frame chromaticity prediction modes if the intra-frame brightness prediction mode is the vertical prediction mode;

taking the Planar mode, the DC mode, a first direction prediction mode and the horizontal prediction mode as the first group of candidate intra-frame chromaticity prediction modes if the intra-frame brightness prediction mode is the first direction prediction mode and an included angle between a first direction corresponding to the first direction prediction mode and the horizontal direction is smaller than or equal to a first angle;

taking the Planar mode, the DC mode, a second direction prediction mode and the vertical prediction mode as the first group of candidate intra-frame chromaticity prediction modes if the intra-frame brightness prediction mode is the second direction prediction mode and an included angle between a second direction corresponding to the second direction prediction mode and the vertical direction is smaller than or equal to a second angle;

taking the Planar mode, the DC mode, the horizontal prediction mode, the vertical prediction mode and a third direction prediction mode as the first group of candidate intra-frame chromaticity prediction modes if the intra-frame brightness prediction mode is the third direction prediction mode, an included angle between a third direction corresponding to the third direction prediction mode and the horizontal direction is greater than the first angle and an included angle between the third direction and the vertical direction is greater than the second angle, wherein the first direction, the second direction and the third direction each refer to any one of 33 directions ranging from ang_2 direction to ang_34 direction except the horizontal direction and the vertical direction.

12. The non-transitory computer-readable storage medium according to claim 9, wherein the method further comprises: before determining whether the first nz prediction modes in the $n_1$ sequenced candidate intra-frame chromaticity prediction modes include the intra-frame brightness prediction mode of the current prediction unit, determining whether the $n_1$ sequenced candidate intra-frame chromaticity prediction modes include an ang_34 direction prediction mode and whether the ang_34 direction prediction mode is not the prediction mode sequenced as the leading one;

deleting the ang_34 direction prediction mode from the $n_1$ sequenced candidate intra-frame chromaticity prediction modes if the $n_1$ sequenced candidate intra-frame chromaticity prediction modes include the ang_34 direction prediction mode and the ang_34 direction prediction mode is not the prediction mode sequenced as the leading one;

determining whether the first nz prediction modes in the $n_1$ sequenced candidate intra-frame chromaticity prediction modes include the intra-frame brightness prediction mode if the $n_1$ sequenced candidate intra-frame chromaticity prediction modes do not include the ang_34 direction prediction mode or if the $n_1$ sequenced candidate intra-frame chromaticity prediction modes include the ang_34 direction prediction mode but the ang_34 direction prediction mode is the prediction mode sequenced as the leading one.

* * * * *